United States Patent [19] — Benninger et al.
[11] 3,882,182
[45] May 6, 1975

[54] TERTIARY PERFLUORO-AMINO ETHERS

[75] Inventors: Siegfried Benninger, Schwalbach, Taunus; Thomas Martini, Neuenhain, Taunus, Germany

[73] Assignee: Hoechst Aktiengesellschaft, Frankfurt am Main, Germany

[22] Filed: Aug. 9, 1973

[21] Appl. No.: 386,857

[30] Foreign Application Priority Data
Feb. 9, 1973    Germany............................. 2306438

[52] U.S. Cl............. 260/584 C; 260/584 R; 204/81; 252/78; 260/583 GG
[51] Int. Cl.............................................. C07c 93/02
[58] Field of Search .................... 260/563 R, 584 C

[56] References Cited
UNITED STATES PATENTS

| | | | |
|---|---|---|---|
| 2,519,983 | 8/1950 | Simons.......................... | 260/583 GG |
| 2,594,272 | 4/1952 | Kauck et al................... | 260/583 GG |
| 2,616,927 | 11/1952 | Kauck et al................... | 260/583 GG |
| 2,631,151 | 3/1953 | Kauck et al................... | 260/583 GG |
| 2,713,593 | 7/1955 | Brice et al...................... | 260/584 C |
| 3,641,167 | 2/1972 | Moore et al. ................. | 260/583 GG |

FOREIGN PATENTS OR APPLICATIONS

| | | | |
|---|---|---|---|
| 1,026,925 | 4/1966 | United Kingdom.......... | 260/583 GG |
| 817,151 | 10/1951 | Germany...................... | 260/583 GG |
| 841,151 | 6/1952 | Germany...................... | 260/583 GG |
| 1,069,639 | 11/1959 | Germany...................... | 260/583 GG |
| 1,389,724 | 1/1965 | France ......................... | 260/583 GG |

*Primary Examiner*—Lewis Gotts
*Assistant Examiner*—D. R. Phillips
*Attorney, Agent, or Firm*—Curtis, Morris & Safford

[57] ABSTRACT

Perfluorinated hydrogen-free amines having side chains which contain ether bonds are formed by the electrolysis, carried out in anhydrous hydrofluoric acid, of the products of addition of hexafluoropropene to amino alcohols.

8 Claims, No Drawings

TERTIARY PERFLUORO-AMINO ETHERS

The present invention relates to tertiary perfluoro-amino ethers and a process for their preparation.

It is known that perfluorinated alkanes, ethers and tertiary amines are particularly important for such applications which require an extraordinary degree of chemical inertness. Because of their stability to elementary fluorine, highly reactive fluorine compounds or oxygen, these compounds have become indispensable for certain applications in chemical and nuclear technology. Furthermore, because of a combination of favorable physical constants, they are more suitable as cooling liquids or heat transfer media in electric or electronic systems than hydrogen containing classes of substances; especially interesting in this connection are such data as dielectric constant, factor of dielectric losses, break down voltage, surface tension or viscosity.

Perfluoro-ethers and tertiary perfluoro-amines which, as is known, are very close to perfluoro-alkanes with respect to their chemical properties, have an extraordinary chemical stability. As to their physical properties, perfluoro-n-alkanes, depending on their chain length, may considerably differ from perfluorinated ethers and amines in their tendency to crystallize. Since the oxygen and nitrogen atoms cause mobility or disturbance of the rigid $(CF_2)_n$-chain, they provoke a decrease of the solidification points, although the number of carbon atoms is the same.

Contrary to the solidification points, the boiling points of perfluoro-alkyl compounds depend only insignificantly on structure, which fact is due to the extraordinary small inter-molecular forces in perfluoro-alkyl compounds. According to a first approximation, they are rather a function of the number of carbon atoms of a perfluoro-alkyl substance.

The present invention provides a new class of tertiary perfluoro-amino ethers corresponding to the following formula (I)

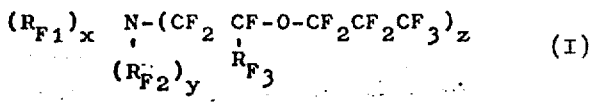

$$(R_{F1})_x \; N-(CF_2 \; CF-O-CF_2CF_2CF_3)_z \quad (I)$$
$$(R_{F2})_y \; R_{F3}$$

where
$x$, $y$ and $z$ each are integers; $x$ and $y$ each being 0, 1 or 2;
$z$ being 1, 2 or 3; the sum of $x + y + z$ always being 3;
$R_{F1}$ and $R_{F2}$ each are linear and/or branched perfluoro-alkyl radicals having from 1 to 10 carbon atoms;
$R_{F3}$ is a trifluoromethyl group or a fluorine atom.

The upper limit of the number of carbon atoms is not exactly a limit in principle, but when the number of carbon atoms is greater than 10, for example from 11 to 16, the properties characteristic for this class of compounds become gradually closer to those of perfluoro-alkanes, especially in the case where $z$ is 1.

The new substances are aliphatic tertiary perfluoro-amino ethers which, contrary to those hitherto known, contain at least one $-CF_2CF_2-O-CF_2CF_2CF_3$ or

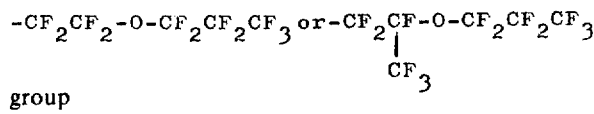

$$-CF_2CF_2-O-CF_2CF_2CF_3 \text{ or } -CF_2CF-O-CF_2CF_2CF_3$$
$$\qquad\qquad\qquad\qquad\qquad\qquad\quad |$$
$$\qquad\qquad\qquad\qquad\qquad\qquad\quad CF_3$$

group linked to nitrogen.

It has also been found that these tertiary perfluoro-amino ethers which can be obtained by electrofluorination of tertiary hexa-fluoro-propoxy-alkyl-amines described further below, are excellently suitable for the cited uses as heat transfer media or dielectrics in electric systems. These applications require viscosities and dielectric constants as low as possible, and also chemical inertness to metals, oxides, oxygen and plastics.

For comparable boiling ranges, the substances of the invention are distinguished by viscosities and dielectric constant values which are below those of hitherto known products, for example perfluoro-polyether fluids, by a factor of 0.8 to 0.2. Furthermore, part of these substances excell in having substantially lower solidification points at comparable boiling ranges as compared to the substances hitherto known, so that they may be used also as low temperature lubricants down to a temperature of $-100°C$.

One of the special advantages of the class of substances of the present invention is the variability of the product properties, which may be adapted to different applications. Thus, for example, the high-boiling members of this class, having boiling points of 250°C and more, are especially suitable as lubricants of thermal high thermal stability which are distinguished by a relative temperature independence of their viscosities and possess the chemical resistance peculiar to perfluorinated substances. Furthermore, the substances of the invention may be used as hydraulic liquids, inert solvents for chemical reactions with highly fluorinated substances or for highly reactive fluorination agents.

Because of higher solubility values for oxygen and better dispersibility of, especially, the low-boiling substances in accordance with this invention, as compared to hitherto known perfluorinated products (cf. German Offenlegungsschrift No. 2,144,094), they may also be used as superior oxygen carriers in blood substitute liquids.

The aforementioned parallelism of the product properties is obtained by determined alterations of the parameters $x$, $y$, $z$, $R_{F1}$, $R_{F2}$ and $R_{F3}$ in formula (I). Thus, by choosing longchain radicals $R_{F1}$ and $R_{F2}$, it is possible to obtain high-boiling compounds which are close to the teriary perfluoro-alkylamines with respect to their properties. Chain branching results in a decrease of the solidification points. An increase of the $z$ value from 1 to 2 or 3 alters the product properties in such a manner that they become more similar to perfluoro-polyethers.

All substances of the invention possess a general extraordinary chemical inertness to aggressive chemicals, for example concentrated mineral acids, alkaline lyes, oxidants, reducing agents, also to elementary fluorine and other strong fluorination agents such as halogenated fluorides and different metal fluorides.

The present invention relates furthermore to mixtures of compounds of the above formula (I) having different substituents $R_{F1}$ and/or $R_{F2}$ and/or $R_{F3}$, which mixtures are obtained in the electrofluorination of a compound of formula (II) described further below. It is characteristic for the fluorination reactions of the kind carried out in accordance with the present invention that also fission products are obtained in each case, which means that, at certain preferred places, there is a fission of the molecule during the fluorination. Such preferred places are at the ether group, but also at secondary carbon atoms. Thus, there are found mostly such secondary components in the fluorination products which are shortened by one $OC_3F_7$ radical, for example

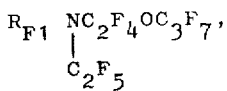

when the starting material has the following structure formula: $R_1N(C_2H_4OC_3F_6H)_2$.

Another example for a side reaction is the formation of $C_6F_{13}N(C_2F_4OC_3F_7)_2$ and

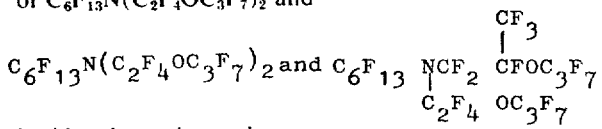

besides the main product

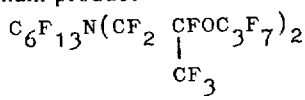

when

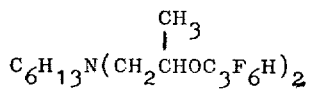

is subjected to an electrofluorination.

For many technical applications, it is entirely sufficient or even advantageous to use these mixtures instead of an isolated pure compound.

The present invention furthermore provides a process for the preparation of tertiary perfluoro-amino ethers of formula (I), which comprises dissolving a compound of formula (II)

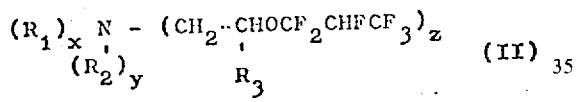

where $R_1$ and $R_2$ are linear and/or branched alkyl radicals having from 1 to 16, preferably from 1 to 10, carbon atoms, $R_3$ is H or $CH_3$ and $x$, $y$ and $z$ are as defined in formula (I), in anhydrous hydrofluoric acid, and electrolyzing the solution.

This process offers a surprisingly favorable preparative method for the tertiary perfluoro-amino ethers of formula (I), which, for their part, are excellently suitable for the aforementioned applications.

Thus, the amino ethers cited as follows may be prepared with partially very good yields of more than 50 percent: $(CF_3)_2CF(CF_2)_2N(CF_2CF_2OC_3F_7)_2$; $CF_3(CF_2)_7N(CF_2CF_2OC_3F_7)_2$;

The starting substances of formula (II) are prepared by reaction of the corresponding amino alcohols or their amino alcoholates with hexafluoropropene.

According to the process of German Patent application No. P 2,306,464.4, the reaction is carried out with molar amounts of hexafluoropropene in aprotic solvents (for example acetonitrile) in the presence of basic catalysts (for example triethylamine) at about 0° to 50°C.

The products of formula (II) obtained are water-insoluble liquids having a relatively high viscosity, which form mostly water-soluble salts with acids; the important point is that in hydrofluoric acid, they give solutions having a good electric conductivity.

Suitable compounds of formula (II) are for example: $(CH_3)_2CH(CH_2)_2 - N(CH_2CH_2OC_3F_6H)_2$ ; $CH_3(CH_2)_7N(CH_2CH_2OC_3F_6H)_2$:

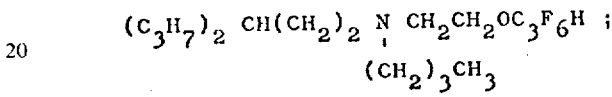

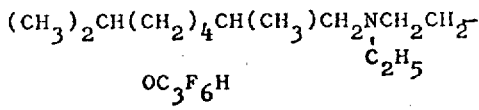

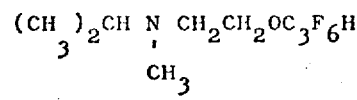

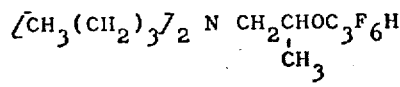

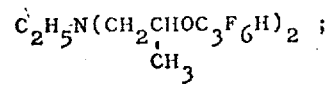

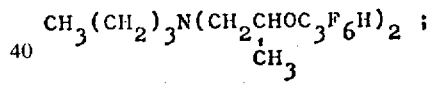

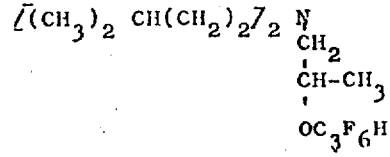

It is characteristic for these substances (II) that besides compounds having the radical

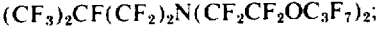

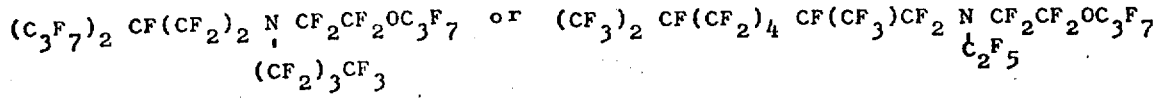

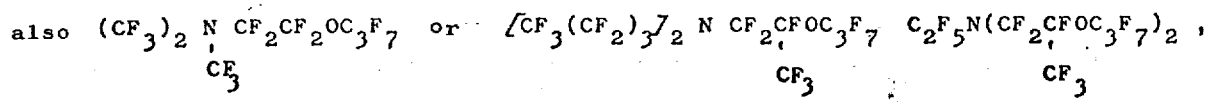

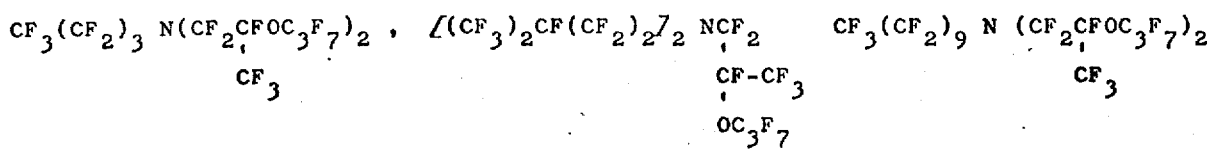

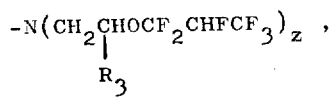

they always also contain compounds of unsaturated radicals of the following structure

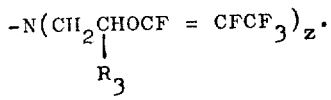

A result of these blends is the fact that also perfluoromethyl ether groups

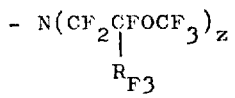

may be among the fluorination products; they are formed as by-products in the saturation of the CF=CF double bonds by fission thereof. Examples are compounds of the following kind:

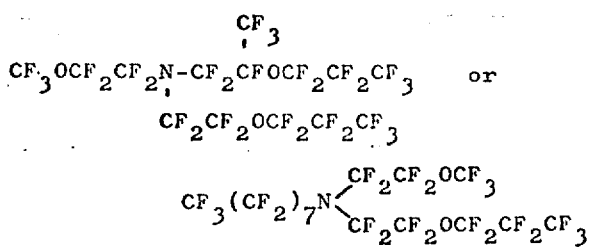

The substances of formula (II) are interesting starting materials for the electrofluorination, thereby obtaining yields which, depending on the structure, are considerably higher than those obtained when using comparable known tertiary amines or ethers having the same number of carbon atoms.

On the other hand, the substances (I) of the present invention can be prepared only to a very limited extent by electrofluorination of fluorine-free amino ethers analogous to (II); generally, the yields obtained in this case are only a small fraction of those attainable by means of the process in accordance with this invention. Furthermore, the high molecular weight perfluorinated compounds (I), where $z$ is greater than 1 and $R_{F1}$ or $R_{F2}$ has a number of carbon atoms greater than 3, practically cannot be prepared any more by electrofluorination of fluorine-free compounds analogous to II.

The use of partially fluorinated substances of formula (II), as compared to corresponding fluorine-free starting materials, results in a considerable saving of energy by decreased current requirements and thus also less expenditure for cell cooling and hydro-fluoric acid condensation from the waste gas. Furthermore, from the point of view of profitability of the preparative process of the perfluoro-amino ethers of the invention, the price of the starting materials is of utmost importance; ammonia, primary or secondary amines, propylene oxide or ethylene oxide and perfluoro-propene are easily obtainable large-scale commercial products at disposal for the process in accordance with this invention.

The electrofluorination of the products (II) to form the tertiary perfluoro-amino ethers of formula (I) is carried out in a usual Simons cell (cf. U.S. Pat. No. 2,519,983), which consists of a vessel made from stainless steel and having a capacity of 1.5 liters, provided with double jacket, reflux condenser with device for alkaline scrubbing of waste gas connected to it, circulation pump and liquid level indicator. The electrodes are a package of parallelly mounted, electrically insulated nickel plates of alternating polarity having a total anode area of 30.8 dm$^2$.

The electrolysis always proceeds for several days, since at the start there is a prolonged inhibition before the formation of product begins. At batchwise operation and a relatively short total working time compared to the inhibition time, this inhibition adversely affects the current efficiency. Since, however, the processes of this invention may of course be carried out continuously without any difficulty, the current efficiency data given in the Examples can be increased to a multiple thereof; contrary to the indicated yields of substances, they are not characteristic for this mode of preparation. But even with respect to substance yields it has been observed that they may be increased by a factor up to a half when the equipment is correspondingly enlarged.

The partially fluorinated amino ethers of formula (II) give homogeneous solutions having a good electric conductivity in hydro-fluoric acid; the perfluorinated amino ethers, however, are insoluble in hydrofluoric acid and are discharged from the bottom of the cell.

Usual operational conditions are attained at a voltage of from 4 to 7.5 volts and a current density of from 0.3 to 3.0 A/dm$^2$. The concentration of the starting materials is generally from 25 to 5 weight percent; this concentration is kept nearly constant by discontinuous addition of material in intervals of several hours. In analogous manner, the liquid level in the cell is maintained by addition of hydrofluoric acid when necessary.

The electrolysis temperature may vary within relatively wide limits, for example within a range of from $-20°$ to $+30°C$; the preferred range being from $-5°$ to $+15°C$.

The work-up and purification of the perfluorinated crude products is carried out by a several hour boiling with 10 to 50 percent aqueous alkaline lye. This serves also for the removal of partially fluorinated products always present, and of carboxylic acid fluorides which by this method are decomposed or converted to their water-soluble salts. Only the chemically inert substances (I) remain which are separated from the alkaline lye by steam distillation or by repeated thorough washing with large amounts of water, subsequently dried and fractionated.

The analysis of the products may be carried out by gas chromatography; after their isolation, the individual components are characterized and their structure determined by preparative gas chromatography, with the analysis data aiding, as well as by mass and F-19-NMR spectorscopy.

The following examples illustrate the invention. Electrofluorination of partially fluorinated amino ethers of formula II

EXAMPLE 1

A simons cell was charged with 80 g of tris-(hexafluoropropoxy-ethyl)-amine and 1,400 g of anhydrous hydrofluoric acid. Within 44 hours, a further 300 g of starting material were added in small portions of about 20 to 30 g. At an electrolysis temperature of + 5°C, an amperage of a constant 30 A and a voltage of from 4.9 to 6.0 volts and after a total of 51 hours, 237 g of perfluorinated crude product were obtained, corresponding to 43.1 percent of the theoretical yield, relative to the following reaction equation:

$N(C_2H_4-OCF_2CHFCF_3)_3 + 15 HF$ 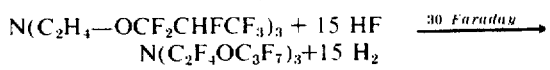 $N(C_2F_4OC_3F_7)_3 + 15 H_2$ 212 g of dry, stabilized product having a boiling range from 149° to 219°C were isolated from the crude product. The stabilized product contained the following compound $N(CF_2CF_2OCF_2CF_2CF_3)_3$ as the main component, having the highest peak observed at $m/e = 850$ in the mass spectrum, corresponding to M-F.

| Analysis | found: 20.6 % C; 72.4 % F; | 0.3 % H |
|---|---|---|
|  | calculated: 20.7 % C; 72.1 % F; | 0 % H |

The indicated structure was confirmed by the F-19-FMR spectrum. About 71 percent of the fraction having the boiling range of 206°–219°C/760 mm Hg (corrected) consisted of the cited product. About 17 area percent of the stabilized crude product consisted of a substance of the highest mass peak of which is at $m/e = 712$, corresponding to M - 3F.

| Analysis | found: 20.8 % C; 71.5 % F; | 0.3 % H |
|---|---|---|
|  | calculated: 20.3 % C; 71.6 % F; | 0 % H |

According to the NMR spectrum, the substance had the following structure:

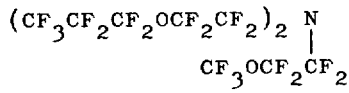

Furthermore, substances of the following composition were isolated in the fluorination product: $C_2F_5N(CF_2CF_2OCF_2CF_2CF_3)_2$ ; 17 area percent; highest mass peak: $m/e = 684$, corresponding to M - F. $(CF_3CF_2OCF_2CF_2)_2 N (CF_2CF_2OCF_2CFHCF_3)$; 7.3 area percent; highest mass peak: $m/e = 832$, corresponding to M - F.

EXAMPLE 2

In an electrolysis cell having a capacity of about 38 liters, the design of which is similar to that of the laboratory cell, 35.1 kg of anhydrous hydrofluoric acid and 2.2 kg of tris-(hexafluoro-propoxy-ethyl)-amine were electrolyzed. In the course of 75 hours, a further 4.6 kg of amino ether were added in small portions. After a total of 92 hours of operation at an electrolysis temperature of 0°C, a current density of 0.3 A/dm² and a voltage of a maximum of 6.0 volts, a total of 4.92 kg of fluorination product was taken off the cell, which corresponds to about 55 percent of the theoretical yield, relative to the reaction equation of Example 1.

The qualitative composition was identical to that of the product described in Example 1, but the content of main component was 57 percent higher than that of Example 1; this being a result of the decreased temperature.

EXAMPLE 3

Within 81 hours, 582 g of n-butyl-bis-(hexafluoropropoxy-ethyl)-amine were electrolyzed in the electrolysis cell as described before at a temperature of 15°C, a current density of 2.1 A/dm² and a voltage of from 4.9 to 6.2 volts. A total of 546 g of fluorination product, corresponding to 54 percent of the theoretical yield, relative to the following reaction equation $C_4H_9N(C_2H_4OC_3F_6H)_2 + 19 HF$ 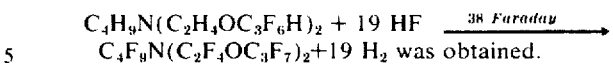 $C_4F_9N(C_2F_4OC_3F_7)_2 + 19 H_2$ was obtained.

The crude product treated with alkali had a boiling range of from 130°C/760 mm Hg (corrected) and contained the following main components: 1) $CF_3-(CF_2)_3-N(CF_2CF_2OCF_2CF_2CF_3)_2$; 60 area percent; highest mass peak at $m/e = 765$; corresponding to M - 2F

| Analysis | found: 21.4 % C; 73.5 % F; | 0.3 % H |
|---|---|---|
|  | calculated: 20.9 % C; 73.4 % F; | 0 % H |

The cited structure was proved by the NMR spectrum.

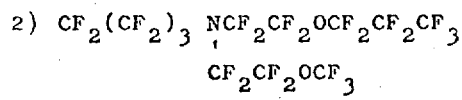

10.2 area percent; highest mass peak at $m/e = 634$, corresponding to M -CF₃.

| Analysis | found: 20.8 % C; 73.2 % F; | 0.3 % H |
|---|---|---|
|  | calculated: 20.5 % C; 73.0 % F; | 0 % H |

Furthermore, the following structures could be found by mass spectroscopy for two other components of the crude product on account of their fragmentation series:

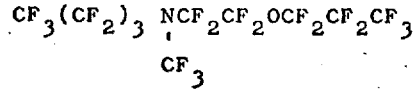

9.8 area percent, and

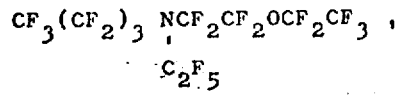

4.1 area percent.

The highest mass peaks measured were in both cases at $m/e = 568$, corresponding to M - F.

EXAMPLE 4

495 g of di-n-butyl-(hexafluoro-propoxy-ethyl)-amine were fluorinated at + 5°C in the laboratory cell. The test was run for 65 hours and yielded a total of 761 g of crude product, which, relative to the following reaction equation $(C_4H_9)_2NC_2H_4OC_3F_6H + 23 HF$ 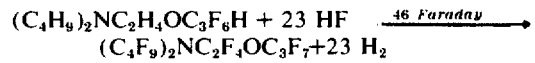 $(C_4F_9)_2NC_2F_4OC_3F_7 + 23 H_2$ corresponded to 71 percent of the theoretical yield.

After a 2 hour boiling, the crude product was separated from the aqueous alkaline solution and immediately subjected to a vacuum distillation. After separation of small amounts of water in the distillate and drying of the perfluorinated product, 86 percent by weight of the crude product used were recovered having a boiling range of from 117° to 207°C/760 mm Hg (corrected); the main fraction passing over at 185° to 207°C.

The main component took 56 percent of the area of the gas chromatogram of the crude product; on account of its mass spectrum — highest mass peak at $m/e = 718$, corresponding to M-F — the substance was determined as being $(CF_3(CF_2)_3)_2NCF_2CF_2OCF_2CF_2CF_3$

| Analysis | found: | 20.7 % C; | 73.9 % F; | 0.3 % H |
|---|---|---|---|---|
|  | calculated: | 21.2 % C; | 74.6 % F; | 0 % H |

As a secondary product, taking 7.3 area percent and showing the highest mass peak at $m/e = 701$, corresponding to M⁺, the following compound was identified:

$$[H(CF_2)_4]_2 NCF_2CF_2OCF_2CF_2CF_3$$

A further secondary component, taking 9.5 area percent, was the degradation product $C_2F_5N(C_4F_9)_2$. It was identified by gas chromatography and mass spectroscopy with the aid of a comparative substance of the same structure.

EXAMPLE 5

In the same manner as indicated in Example 4, 380 g of n-octyl-bis-(hexafluoro-propoxy-ethyl)-amine were fluorinated in the laboratory cell at + 5°C, a current density of 1.0 A/dm² and a voltage of from 4.4 to 6.2 volts. The yield of 238 g of crude product corresponded to 26.7 percent of the theoretical yield, relative to the following reaction equation

$$C_8F_{17}N(C_2F_4OC_3F_7)_2 + 27 H_2.$$

The boiling range of the crude product treated with alkali was from 35° to 108°C/0.4 mm Hg; it contained a main component taking 40 area percent of the gas chromatogram. By fractionation, this component was concentrated to 74 area percent of the fraction having a boiling range of from 70° to 90° C/0.4 mm Hg.

The mass spectrum of this component showed the highest mass peak at $m/e = 984$, corresponding to M-F; the highest intense peak was at $m/e = 818$, corresponding to M - $OC_3F_7$. The following structure $CF_3(CF_2)_7N(CF_2CF_2OCF_2CF_2CF_3)_2$ was proved by the NMR spectrum.

| Analysis | found: | 21.2 % C; | 72.2 % F; | 0.3 % H |
|---|---|---|---|---|
|  | calculated: | 21.0 % C; | 71.9 % F; | 0 % H |

The following secondary components were identified:

1) 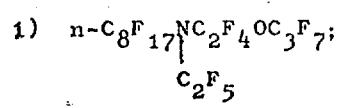

10.5 area percent; highest mass peak: $m/e = 768$, corresponding to M - $CF_3$

2) 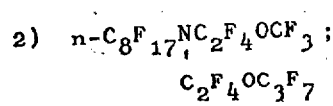

11.9 area % and a highest mass peak at $m/e = 864$, corresponding to M - 3F.

EXAMPLE 6

In analogy to the processes described before, 355 g of tris-(hexafluoro-propoxy-isopropyl-amine were fluorinated in the Simons cell. The test was run for 127 hours at an average current density of 1.15 A/dm², a voltage in the range of from 4.7 to 6.15 volts and a constant electrolysis temperature of 0°C. The starting amine concentration was 5.5 weight percent. During the electroylsis, a total of 302 g of fluorinated crude product was obtained, corresponding to 53.6 percent of the theoretical yield, relative to the following reaction equation:

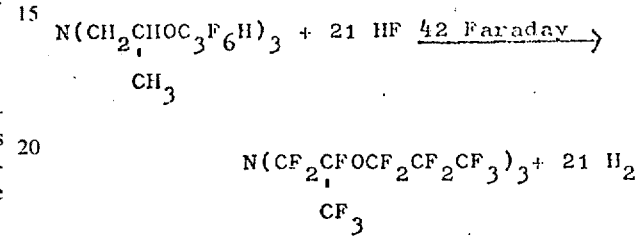

The product was boiled in the usual manner for 3 hours with 20 percent KOH solution, subsequently washed and dried; this procedure decreased the amount of product by 5.5 percent of its weight. The gas chromatogram of the product stabilized with alkali showed an extraordinary great number of components, caused by the steric hindrance at the nitrogen atom. The main fractions passed over at 175° - 206°C/760 mm Hg and 206° - 234°C/760 mm Hg. The temperatures indicated are stem corrected. The following substances were identified:

1) 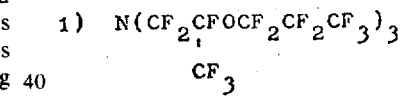

5.8 area percent; highest mass peak at $m/e = 962$, corresponding to M - 3F

2) 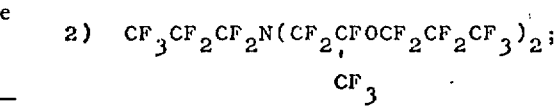

6.2 area percent; $m/e = 734$ (M-$CF_3$)

3) 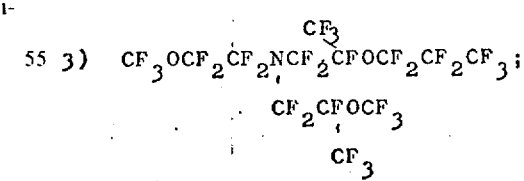

5.3 area -percent; $m/e = 712$ (M-3 F)

4) 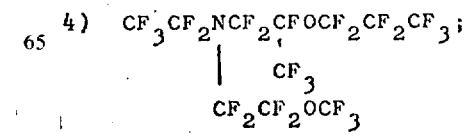

9.9 area -percent; m/e = 596 (M-3F)

5) 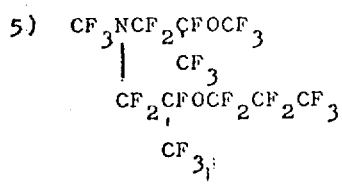

10.0 area -percent; m/e = 596 (M - 3F)

6) 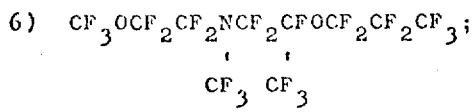

m/e = 546 (M-3F); 4.0 area -percent

7) 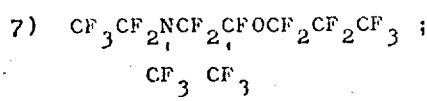

5.5 area -percent m/e = 480 (M-3F)

What is claimed is:
1. A compound of the formula

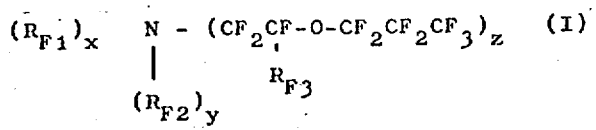 (I)

where
$R_{F1}$ is a linear or branched perfluoro-alkyl radical having from 1 to 10 carbon atoms;
$R_{F2}$ is a perfluoro-alkyl radical having from 1 to 10 carbon atoms or the radical

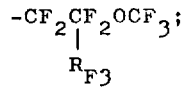

$R_{F3}$ is a CF$_3$ or F radical;
x, y and z each are integers; x an y each being 0, 1 or 2, z being 1,2 or 3, and x + y + z being 3.

2. A compound as claimed in claim 1 having the formula

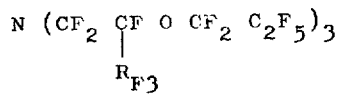

3. A compound as claimed in claim 1 having the formula

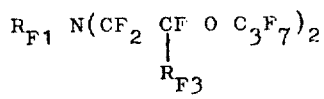

where $R_{F1}$ is a perfluoro-alkyl radical having from 1 to 8 carbon atoms.

4. A compound as claimed in claim 1, having the formula $R_{F1}$ N(C$_2$F$_4$ O C$_3$F$_7$)$_2$ where $R_{F1}$ is a perfluoro-alkyl radical having from 6 to 10 carbon atoms.

5. A compound as claimed in claim 1, having the formula

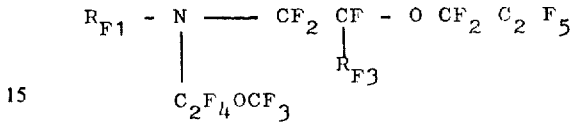

where $R_{F1}$ is a perfluoro-alkyl radical having from 1 to 8 carbon atoms.

6. A compound as claimed in Claim 1, having the formula

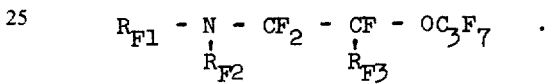

where $R_{F1}$ is a perfluoro-alkyl radical having from 1 to 4 carbon atoms and $R_{F2}$ a perfluoro-alkyl radical having from 2 to 8 carbon atoms.

7. A compound as claimed in Claim 1, having the formula

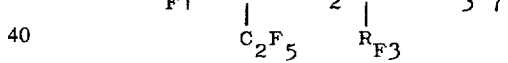

where $R_{F1}$ is a perfluoro-alkyl radical having from 1 to 8 carbon atoms.

8. A compound as claimed in claim 1, having a formula

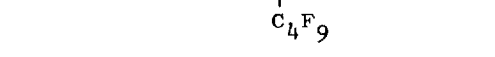

where $R_{F1}$ is a perfluoro-alkyl radical having from 1 to 9 carbon atoms.

* * * * *